UNITED STATES PATENT OFFICE.

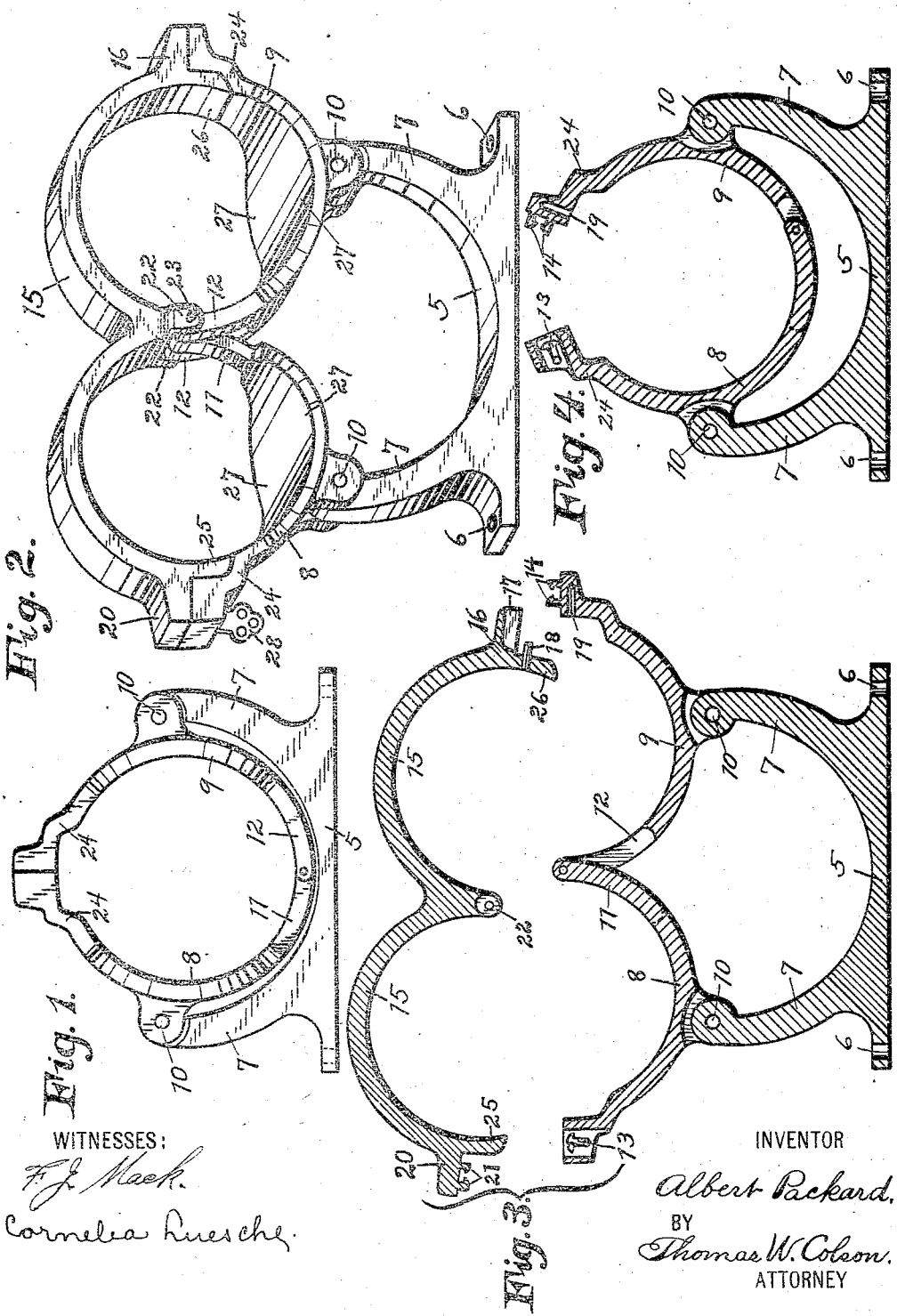

ALBERT PACKARD, OF INDIANAPOLIS, INDIANA, ASSIGNOR OF ONE-HALF TO FRED J. MACK, OF INDIANAPOLIS, INDIANA.

VEHICLE-TIRE-LOCKING DEVICE.

969,396.

Specification of Letters Patent.

Patented Sept. 6, 1910.

Application filed May 20, 1910. Serial No. 562,546.

*To all whom it may concern:*

Be it known that I, ALBERT PACKARD, a citizen of the United States, and a resident of Indianapolis, in the county of Marion and State of Indiana, have invented certain new and useful Improvements in Vehicle-Tire-Locking Devices, of which the following is a specification.

My invention relates to devices for supporting and locking vehicle tires, and the object of my improvement is to provide a simple device to support and lock, on the running board or other convenient position, the spare tires ordinarily carried by motor vehicles. I attain these objects by means of the device illustrated in the accompanying drawings, in which—

Figure 1 is a side elevation of the device arranged to hold one tire; Fig. 2 is a view, in perspective, showing the device arranged to hold two tires; Fig. 3 is a sectional elevation of the device as illustrated in Fig. 2; and, Fig. 4 is a similar view of the device as illustrated in Fig. 1.

The base 5 is provided with the screw holes 6 by which it is secured to the running board or other convenient place on a motor vehicle. The curved arms 7 are secured to or formed integral with said base and pivotally connected at their outer ends to intermediate portions of the semi-circular supporting members 8 and 9, as at 10, to support the latter. The inner end of the semi-circular member 8 is cut away to form the tongue 11 and the inner end of the semi-circular supporting member 9 is slotted to form the prongs 12, so that said tongue will pass through said slot to allow said semi-circular supporting members to open and close.

The spring lock 13, of any suitable design, is secured in the outer end of the semi-circular supporting member 8 and suitable catches 14 are formed on the outer end of the semi-circular supporting member 9 to engage said lock to lock said members around the tire.

The device is arranged to support and lock two tires by opening the semi-circular supporting members 8 and 9 as indicated in Figs. 2 and 3, and adjusting the double semi-circular member 15 in position on the former. Said double semi-circular member is provided, on its end portion 16, with the groove 17 to engage and cover the catches 14, and the pin 18 to engage the perforation 19, which is formed in the outer end of the semi-circular supporting member 9, and on its end portion 20 with the catches 21, which are similar in size and shape to the catches 14, to engage the lock 13 to form a double annular support and lock for vehicle tires. Said double semi-circular member 15 is provided with the ears 22 on its central portion to engage the inner ends of the semi-circular supporting members 8 and 9 and a perforation formed therethrough to receive the pin 23 to form a strong joint.

The semi-circular supporting members 8 and 9 are provided with the off sets 24 formed in their outer end portions to receive the projections 25 and 26 formed on the double semi-circular member 15 when the device is used to accommodate two tires, and to form a recess for a vehicle felly when it is desired to carry a felly in the tire. The double semi-circular member 15 may also be provided with similar off sets formed in their upper curved portions, when so desired, without departing from this invention.

The semi-circular supporting members 8 and 9 are formed with wide surfaces 27 at their central portions to furnish larger supporting surfaces for the tires to be held.

To support and lock one tire, the semi-circular supporting members are opened, the tire placed between them and said members closed around the tire, which automatically locks the catches 14 in the spring lock 13. Said lock is unlocked in the usual way with its key 28. To support and lock two tires, the semi-circular supporting members 8 and 9 are opened wide (Figs. 2 and 3) and such tires placed, one in each semi-circular supporting member and the double semi-circular member 15 locked in position by placing the groove 17 over the catches 14, entering the pin 18 in the perforation 19 and lowering the end portion 20 until the catches 21 engage and are locked in the spring lock 13. The tires are unlocked by unlocking the lock 13 in the usual manner and removing the double semi-circular member 15 to free the tires.

What I claim as new and desire to secure by Letters Patent, is—

1. In a device of the kind described, the combination with a frame, two semi-circular supporting members, each pivoted at a point intermediate of its length to said frame, a lock formed in the outer end of one of said semi-circular supporting members and catches formed on the outer end of the other of said semi-circular supporting members adapted to engage said lock, of a double semi-circular member adapted to be secured at one of its ends to said catches and provided with other catches on its other end adapted to engage and lock in said lock to form a double annular support and lock, substantially as described.

2. In a device of the kind described, the combination with two semi-circular supporting members pivotally mounted to close around and support a tire, a lock secured in one end of one of said semi-circular supporting members and catches secured on one end of the other of said semi-circular supporting members adapted to engage and lock in said lock, of a double semi-circular member having one of its ends adapted to be removably secured to the end of said semi-circular supporting member provided with said catches, its other end provided with other catches and adapted to be locked in said lock and its central portion having ears adapted to be removably secured to the other ends of said semi-circular supporting members to form a double annular support and lock.

In witness whereof, I hereunto sign my name in the presence of two witnesses.

ALBERT PACKARD.

Witnesses:
 FRANCIS M. SPRINGER,
 F. J. MACK.